United States Patent [19]

Kokubo et al.

[11] Patent Number: 4,883,949

[45] Date of Patent: Nov. 28, 1989

[54] DATA READER

[75] Inventors: Hiroshi Kokubo, 10-8 Ohharano-Kamisato-Momiji-cho, Nishikyo-ku, Kyoto city, 610-11, Kyoto; Kinji Tsuboi, Yokohama, both of Japan

[73] Assignees: Tokyu Car Corporation, Yokohama; Hiroshi Kokubo, Kyoto, both of Japan

[21] Appl. No.: 186,438

[22] Filed: Apr. 26, 1988

[30] Foreign Application Priority Data

Apr. 27, 1987 [JP] Japan ................................ 62-104108

[51] Int. Cl.$^4$ .............................................. G06K 7/08
[52] U.S. Cl. .................................. 235/449; 235/487; 235/494
[58] Field of Search ............... 235/439, 449, 487, 494, 235/462; 360/123

[56] References Cited

U.S. PATENT DOCUMENTS

| | | | |
|---|---|---|---|
| 3,165,592 | 1/1965 | Brette | 360/123 |
| 3,689,743 | 9/1972 | Rampy | 235/449 |
| 3,898,434 | 8/1975 | Bigelow | 235/494 |
| 4,008,493 | 2/1977 | Pizzuto | 360/123 |
| 4,523,088 | 6/1985 | Utsch | 235/487 |

Primary Examiner—Harold I. Pitts
Attorney, Agent, or Firm—Cushman, Darby & Cushman

[57] ABSTRACT

When an induction coil which is supplied with an alternating current to output an induction current is moved along patterns formed on a data recording sheet, the magnitude of induction current generated in the induction coil changes in accordance with changes in the patterns. The change in the magnitude of the induction current is detected by a read device to thereby read information contained in the data recording sheet.

12 Claims, 3 Drawing Sheets

DATA RECORDING SHEET

MAGNITUDE OF MUTUAL INDUCTION CURRENT

SHAPED WAVEFORM

DATA READER

BACKGROUND OF THE INVENTION

1. Field of the Invention

The present invention relates to a data reader designed to read automatically information concerning, for example, the kind, price or other items of commodities, which is recorded on the surfaces of cards or articles.

2. Description of the Related Art

There have heretofore been various kinds of data reader of the type described above. Examples of the prior art include bar code readers which optically read information recorded in the form of a pattern of parallel bars distinguished from each other by width, magnetic card readers for reading information contained in magnetic stripes formed on magnetic cards, punched card readers for reading information on the basis of a combination of the position and number of punched holes, and IC card readers for reading information recorded in integrated circuits incorporated in IC cards.

This prior art suffers, however, from the following problems.

The prior art that utilizes optical means to read information, such as bar code readers, has the problem that mere dust or dirt attached to either a data recording medium or a data reader leads to a read error.

In the prior art that utilizes magnetic means such as a magnetic card, recorded data itself may be damaged by the influence of an ambient magnetic field.

Punched cards suffer from the problem that the amount of recordable information is disadvantageously limited.

The prior art that utilizes integrated circuits has the disadvantage that the production cost of the data recording medium is higher than in the case of other storage media.

SUMMARY OF THE INVENTION

An object of the present invention is to provide a data reader which is free from the above-described disadvantages of the prior art and which is capable of precisely reading a large amount of data recorded at relatively low cost.

Other objects and advantages of the present invention will become apparent from the following detailed description of illustrated embodiments of the invention.

According to the present invention, there is provided a data reader comprising: an induction coil supplied with an alternating current to output an induction current; a data recording sheet formed with patterns which cause a change in the impedance of the induction coil when coming close to them; and a read device for reading information contained in the data recording sheet on the basis of the output of induction current generated in the induction coil.

BRIEF DESCRIPTION OF THE INVENTION

The present invention may be more fully understood from the description of preferred embodiments of the invention set forth below, together with the accompanying drawings, in which.

Figure 4:
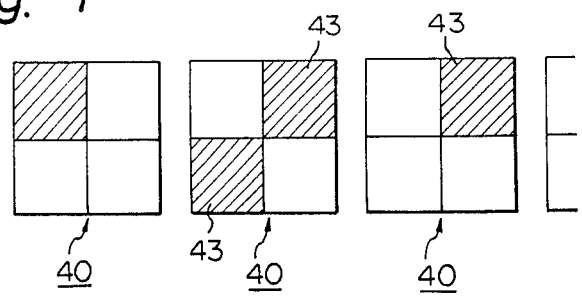
Figure 5:
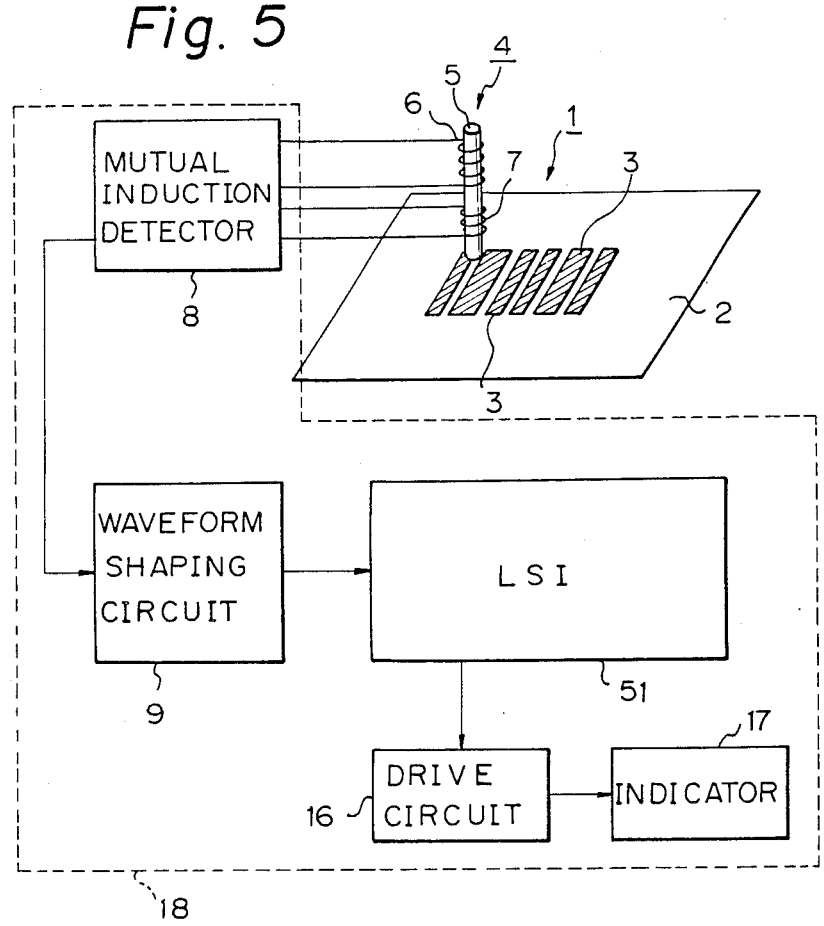

FIG. 4 schematically shows code patterns which are arranged in a different configuration from that of the patterns exemplarily shown in the embodiment; and FIG. 5 is a block diagram of another embodiment of the present invention in which an LSI is employed in place of the microcomputer in the first embodiment.

DESCRIPTION OF THE PREFERRED EMBODIMENTS

Figure 1:
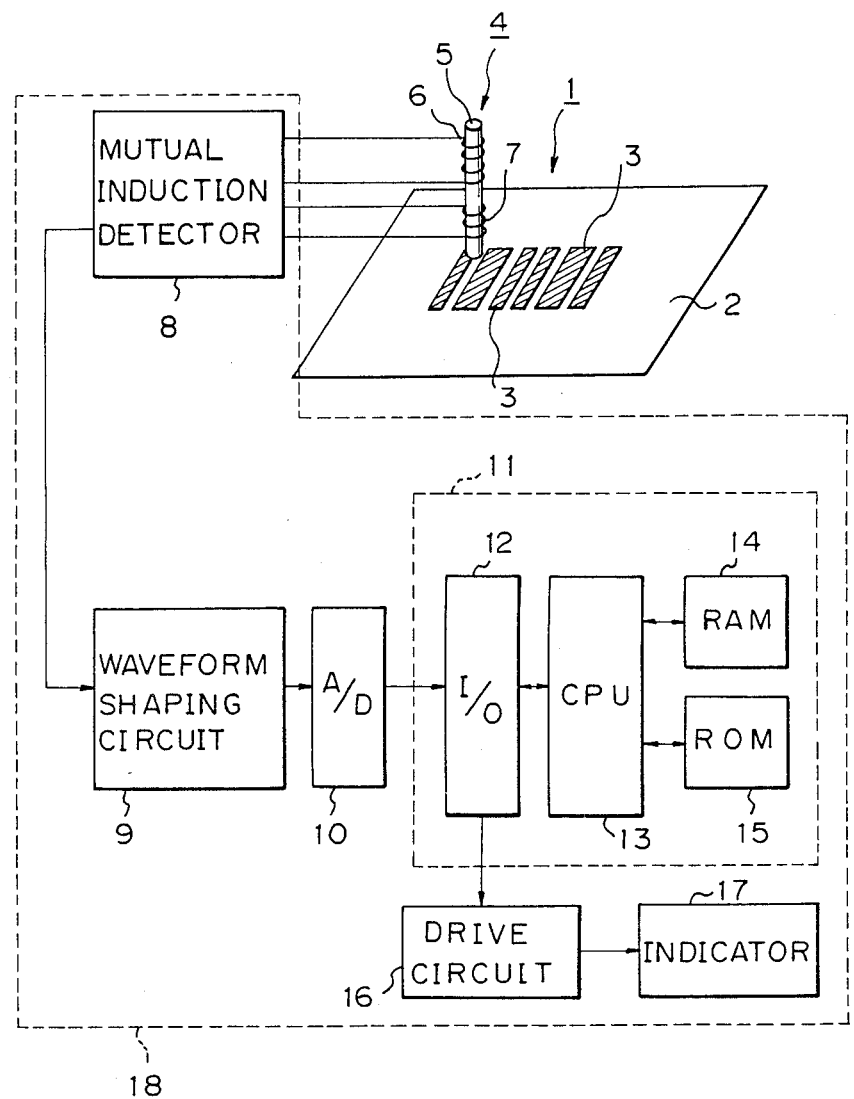
FIG. 1 is a block diagram of one embodiment of the present invention.

FIG. 1 shows one embodiment of the present invention.

The reference numeral 1 denotes a data recording sheet having information recorded thereon which is formed or stuck on the surface of a card or an article. The data recording sheet 1 comprises, for example, an iron material (sheet or foil) 2, and a multiplicity of parallel patterns 3 formed on the surface of the sheet 2, the patterns 3 being defined by pieces of aluminum foil, which is different from the iron material in electric conductivity, stuck on the surface of the sheet 2. Various kinds of information are coded and recorded on the basis of the width and spacing of the patterns 3. It should be noted that the number of patterns 3 shown in FIG. 1 is made smaller than the actual one for simplification of illustration.

The reference numeral 4 denotes a mutual induction coil which causes mutual induction and outputs an induction current. The mutual induction coil 4 comprises a core 5 made of a magnetic material, e.g., ferrite, on which are wound a primary coil 6 supplied with an alternating current and a secondary coil 7 in which a mutual induction current is generated. The primary coil 6 is supplied with a high-frequency alternating current, e.g., 50 mA, 0.2V and about 100 kHz, to produce a magnetic field which causes generation of an induction current in the secondary coil 7. On the other hand, an eddy current is generated in the data recording sheet 1. When the eddy current changes due to a change in the material constituting the data recording sheet 1, the impedance of the mutual induction coil 4 is changed, which results in a change in the magnitude of induction current generated in the secondary coil 7. Accordingly, it is possible to detect the width of each pattern 3 and the spacing between each pair of adjacent patterns 3 by moving the mutual induction coil 4 relative to the data recording sheet 1 and analyzing the induction current generated in the secondary coil 7.

The reference numeral 8 denotes a mutual induction detector arranged to supply a high-frequency alternating current to the primary coil 6 and detect the mutual induction current generated in the secondary coil 7. The reference numeral 9 denotes a waveform shaping circuit for shaping the output waveform from the mutual induction detector 8 into a rectangular wave, while the reference numeral 10 denotes an A/D converter for converting the analog signal output from the waveform shaping circuit 9 into a digital signal.

The reference numeral 11 denotes a microcomputer for arithmetically processing the output from the A/D converter 10. The microcomputer 11 comprises an input/output port 12, a central processing unit (CPU) 13 connected to the input/output port 12, and a RAM 14 and ROM 15 which are connected to the CPU 13. The output terminal of the A/D converter 10 is connected to an input terminal of the input/output port 12, and an indicator 17 which is defined by, for example, a digital indicator, is connected to an output terminal of the input/output port 12 through a drive circuit 16. Thus, the mutual induction detector 8, the waveform shaping circuit 9, the A/D converter 10, the microcomputer 11, the indicator 17 and so on constitute in combination a read device 18 for reading information contained in the data recording sheet 1 from the output of the secondary coil 7.

Figure 2:
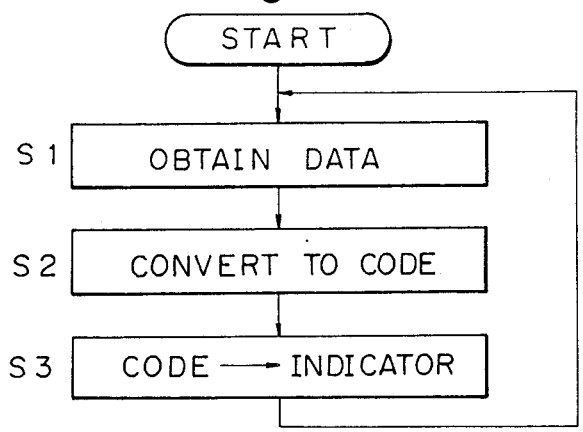
FIG. 2 is a flowchart showing a program executed in the microcomputer in the embodiment.

FIG. 2 shows a program stored in the ROM 15 incorporated in the above-described microcomputer 11, in which the reference symbol S denotes Steps.

According to this program, data concerning a detected pattern is first obtained from: the I/0 port 12 in Step 1, and the pattern data is compared with a standard pattern stored in the ROM 15 and thereby converted into a code signal representing a character or a numeral in Step 2. The code signal thus obtained is output to the drive circuit 16 for the indicator 17 in Step 3. Then, the process returns to Step 1 to repeat a similar operation.

Figure 3A:
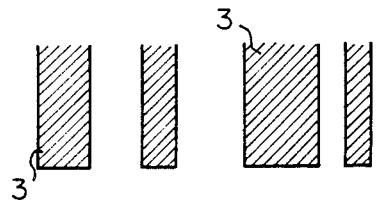
FIGS. 3a to 3c are time charts showing the operation of the circuit according to the embodiment.
Figure 3B:

The operation of the above described embodiment will next be explained with reference also to the time charts shown in FIGS. 3a to 3c.

The mutual induction coil 4 is disposed so as to face the data recording sheet 1, as shown in FIG. 1, and in this state the coil 4 is moved relative to the sheet 1 in such a manner that the coil 4 crosses patterns 3. In consequence, the magnitude of mutual induction current generated in the secondary coil 7 changes in accordance with the width and spacing of patterns 3 of aluminum foil, so that an output waveform whose amplitude and wave width change as shown in FIG. 3b is output from the mutual induction detector 8.

Figure 3C:
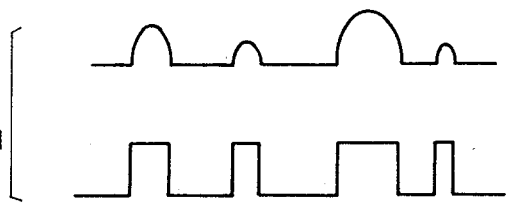

The output waveform is cut at a predetermined slice level and further shaped into a rectangular wave in the waveform shaping circuit 9, as shown in FIG. 3c. The signal thus obtained is input to the A/D converter 10 where it is converted into a digital signal in accordance with the widths of crests and valleys of the rectangular wave. The resulting digital signal is input to the input-/output port 12 of the microcomputer 11 and subjected to an arithmetic processing in the CPU 13. Thus, the information contained in the data recording sheet 1 is converted into a code signal representing a character or a numeral. The code signal is input to the indicator 17 through the drive circuit 16, and a character or a numeral is thus displayed.

It should be noted that, although in the above-described embodiment the data recording sheet 1 comprises a sheet 2 of an iron material and aluminum foil patterns 3 stuck thereon, the present invention is not necessarily limitative thereto and it is possible to employ any type of data recording sheet which bears patterns that cause changes in the magnitude of eddy current generated when the mutual induction coil 4 comes close to them. Accordingly, the data recording sheet 1 may comprise a sheet of a non-metallic material such as plastics or paper and patterns defined by electrically conductive metallic pieces stuck on the sheet, or patterns of a paste which is coated on the sheet surface. Alternatively, the patterns may be printed on the surface of the sheet with ink mixed with a magnetic powder. The present invention is not necessarily limited to sheet-shaped data recording means, and patterns may be formed by cutting linear grooves in the surface of a metallic plate.

As to the pattern configuration, the patterns 3 that are arranged parallel with each other in the form of a bar code are not necessarily limitative, and it is possible to employ any pattern configuration which gives rise to a change in the impedance of the induction coil. For example, the arrangement may be such that, as shown in FIG. 4, pattern elements 43 are selectively disposed in four crosswise divided positions for each pattern block 40.

The mutual induction coil 4 may be replaced with a self-induction coil.

The microcomputer 11 may be replaced with an LSI 51 which converts input pattern data into a code signal representing a character or a numeral and outputs the obtained code signal, as shown in FIG. 5.

According to the data reader of the present invention, an induction coil is moved along patterns formed on a data recording sheet to read information contained in the data recording sheet on the basis of changes in the magnitude of induction current which is generated in the induction coil. Accordingly, it is possible to read precisely a large amount of information without being affected by dirt or dust. In addition, it is possible to manufacture the data recording sheet at low cost and therefore handle it as a disposable element. Further, recorded data is not affected by a magnetic field.

While the invention has been described by reference to specific embodiments chosen for purpose of illustration, it should be apparent that numerous modifications could be made thereto by those skilled in the art without departing from the basic concept and scope of the invention.

What is claimed is:

1. A data reader assembly comprising:
   an induction coil, supplied with an alternating current, and generating an induction current;
   data recording means having a substrate of a first material and patterns of a second material which is a different material than said first material so as to cause a change in the impedance of said induction coil and thereby change an amount of said induction current when coming close to said induction coil; and
   means for reading information in said data recording means on the basis of an output of induction current generated in said induction coil.

2. A data reader assembly according to claim 1, wherein the patterns on said data recording means are formed by arranging materials which have a different property from each other, said property being from the group consisting of electric conductivity or magnetic permeability.

3. A data reader assembly according to claim 1, wherein the patterns on said data recording means are defined by grooves formed in a metallic surface which are varied in width or depth.

4. A data reader assembly according to claim 1, wherein said induction coil is a mutual induction coil comprising a primary coil and a secondary coil.

5. A data reader according to claim 1, wherein said data recording means is in the form of a sheet.

6. A data reader according to claim 2, wherein said materials are arranged alternately and parallel with each other while being varied in width.

7. A data reader assembly according to claim 2, wherein said materials are selectively disposed in four crosswise divided positions for each pattern block.

8. A data reader assembly as in claim 1 further comprising means for converting said change in impedance to a square wave having a first level indicative of said first material and a second level indicative of said second material.

9. A data reader for reading information from a data recording means comprising:
   an induction coil assembly having a primary coil supplied with an alternating current, and a secondary coil for producing an induction current which changes based on eddy currents formed in said data recording means by a field induced by said primary coil; and
   means for determining changes in said induction current caused by said changes in said eddy current.

10. A data reader assembly comprising:
    an induction coil assembly having a primary coil supplied with an alternating current, and a secondary coil for producing an induction current based on a field induced by said primary coil;
    data recording means having a substrate of a first metallic material and patterns of a different metallic material than said first metallic material so as to cause a change in the impedance of said secondary coil when coming close thereto; and
    means for reading information contained in said data recording means on the basis of said induction current generated in said induction coil.

11. An assembly as in claim 10, wherein said change in induction current is caused by a varying eddy current in said different metallic materials.

12. An assembly as in claim 11 wherein said first material as iron and said second material is aluminum.

* * * * *